(12) United States Patent
Eidelman et al.

(10) Patent No.: US 11,160,335 B2
(45) Date of Patent: Nov. 2, 2021

(54) PET HEALTH MONITOR WITH COLLAR ATTACHMENT AND CHARGER

(71) Applicant: Mars, Incorporated, McLean, VA (US)

(72) Inventors: Steven Eidelman, San Francisco, CA (US); David Isbister, San Francisco, CA (US); Todd Pelman, Moss Beach, CA (US); Stephen Senatore, South San Francisco, CA (US); Gadi Amit, San Francisco, CA (US); Inbal Etgar, Berkley, CA (US); Solene Bourgeois, San Francisco, CA (US)

(73) Assignee: Mars, Incorporated, McLean, VA (US)

( * ) Notice: Subject to any disclaimer, the term of this patent is extended or adjusted under 35 U.S.C. 154(b) by 123 days.

(21) Appl. No.: 16/570,771

(22) Filed: Sep. 13, 2019

(65) Prior Publication Data

US 2020/0000183 A1   Jan. 2, 2020

Related U.S. Application Data

(63) Continuation of application No. 14/231,615, filed on Mar. 31, 2014, now Pat. No. 10,420,401.
(Continued)

(51) Int. Cl.
*A44B 99/00* (2010.01)
*A01K 27/00* (2006.01)

(52) U.S. Cl.
CPC ............ *A44B 99/00* (2013.01); *A01K 27/008* (2013.01); *A01K 27/009* (2013.01); *Y10T 24/45241* (2015.01)

(58) Field of Classification Search
CPC .... A44B 99/00; A01K 27/008; A01K 27/009; Y10T 24/45241
(Continued)

(56) References Cited

U.S. PATENT DOCUMENTS

| 1,242,159 | A | 10/1917 | Dunkleberger |
| 1,271,650 | A | 7/1918 | Arkin |

(Continued)

FOREIGN PATENT DOCUMENTS

| DE | 202005013615 U1 | 11/2005 |
| JP | 1602690 S | 4/2017 |

OTHER PUBLICATIONS

Whistle FIT, published 2018 [online], [retrieved on Jul. 17, 2018], Available from internet, URL: <https://www.petinsight.com/whistle-fit/>, 5 pgs.
(Continued)

*Primary Examiner* — Jack W Lavinder
(74) *Attorney, Agent, or Firm* — Mars, Incorporated; Rebecca M. Barnett

(57) ABSTRACT

In one embodiment, a collar attachment comprising a disk having a first collar band loop integrally formed with the disk along a first arcuate perimeter portion of the disk and a second collar band loop integrally formed with the disk along a second arcuate perimeter portion of the disk that is opposite the first arcuate perimeter portion of the disk; a keyhole in the disk; friction attachment means formed in an underside of the disk and configured to receive at least a first tab of an attached device and to snugly hold the first tab against the underside of the disk after rotation of the attached device in the keyhole.

10 Claims, 9 Drawing Sheets

Related U.S. Application Data

(60) Provisional application No. 61/806,710, filed on Mar. 29, 2013.

(58) Field of Classification Search
USPC ........ 24/663, 3.11, 3.12, 668, 606; 368/281, 368/282
See application file for complete search history.

(56) References Cited

U.S. PATENT DOCUMENTS

| | | |
|---|---|---|
| 1,380,177 A | 5/1921 | Louis |
| 1,402,827 A | 1/1922 | Louis |
| 1,754,200 A | 4/1930 | Janes |
| 1,839,896 A | 1/1932 | Theodore |
| 2,364,266 A | 12/1944 | Edward |
| 2,873,082 A | 2/1959 | Gillespie et al. |
| 3,477,409 A | 11/1969 | Costanzo |
| 3,782,017 A | 1/1974 | Graham |
| D242,675 S | 12/1976 | McNair |
| 4,208,986 A | 6/1980 | Costanzo |
| 4,318,234 A | 3/1982 | Charles et al. |
| 4,566,865 A | 1/1986 | Nishitsuji et al. |
| 4,742,503 A | 5/1988 | Braun et al. |
| 4,809,700 A | 3/1989 | Castelli et al. |
| D300,678 S | 4/1989 | Barrault |
| 4,821,424 A | 4/1989 | Loggins |
| 4,940,020 A | 7/1990 | Gordon |
| D337,411 S | 7/1993 | Smith |
| D349,864 S | 8/1994 | Dunlap et al. |
| 5,473,830 A | 12/1995 | Doble |
| 5,553,820 A | 9/1996 | Karten et al. |
| 5,603,094 A | 2/1997 | Greear |
| 5,623,731 A | 4/1997 | Ehrgott et al. |
| D410,206 S | 5/1999 | Slater |
| 6,202,599 B1 | 3/2001 | Cutler |
| 6,314,058 B1 | 11/2001 | Lee |
| D454,991 S | 3/2002 | Muller |
| D460,221 S | 7/2002 | Sloot |
| D464,941 S | 10/2002 | Latto et al. |
| D478,830 S | 8/2003 | So |
| 6,695,269 B1 | 2/2004 | Anscher |
| 6,720,879 B2 | 4/2004 | Edwards |
| 6,805,460 B1 | 10/2004 | Zoller et al. |
| 6,966,533 B1 | 11/2005 | Kalis et al. |
| D521,927 S | 5/2006 | Franck et al. |
| D524,282 S | 7/2006 | Beasley et al. |
| 7,140,989 B2 | 11/2006 | Poruchny |
| D535,281 S | 1/2007 | Yang |
| D537,409 S | 2/2007 | Suzuki |
| D558,209 S | 12/2007 | Ikeda et al. |
| D565,182 S | 3/2008 | Cheng et al. |
| 7,341,561 B2 | 3/2008 | Tanaka et al. |
| D575,289 S | 8/2008 | Kuo et al. |
| D584,176 S | 1/2009 | Maruyama et al. |
| D591,012 S | 4/2009 | Geissler |
| D592,647 S | 5/2009 | L'Henaff et al. |
| D594,404 S | 6/2009 | Kuo et al. |
| D594,874 S | 6/2009 | Sheba et al. |
| D597,676 S | 8/2009 | Copeland et al. |
| D599,241 S | 9/2009 | Andre et al. |
| D608,277 S | 1/2010 | Cano et al. |
| D609,636 S | 2/2010 | Jensen |
| 7,705,736 B1 | 4/2010 | Kedziora |
| D618,802 S | 6/2010 | Brady et al. |
| D619,256 S | 7/2010 | Brady et al. |
| D625,262 S | 10/2010 | Lee et al. |
| D627,718 S | 11/2010 | Houghton |
| 7,823,844 B2 | 11/2010 | Carnevali et al. |
| 8,091,850 B2 | 1/2012 | Carnevali et al. |
| D656,096 S | 3/2012 | Sasada et al. |
| D657,274 S | 4/2012 | Neethling |
| D663,684 S | 7/2012 | Yang |
| D663,685 S | 7/2012 | Yang |
| 8,240,628 B2 | 8/2012 | Huang |
| D667,322 S | 9/2012 | Madrack |
| D668,562 S | 10/2012 | Madrack |
| D669,027 S | 10/2012 | Kumpula et al. |
| D671,921 S | 12/2012 | Beall et al. |
| D673,110 S | 12/2012 | Sasada et al. |
| D673,908 S | 1/2013 | Koch |
| 8,353,603 B2 | 1/2013 | Berry et al. |
| 8,371,250 B2 | 2/2013 | Konovalov |
| 8,398,041 B2 | 3/2013 | Bradley et al. |
| D680,541 S | 4/2013 | Lee et al. |
| D693,814 S | 11/2013 | Park |
| D694,228 S | 11/2013 | Richter |
| 8,616,385 B1 | 12/2013 | Doran |
| D698,376 S | 1/2014 | Funato et al. |
| 8,677,941 B2 | 3/2014 | Yanai et al. |
| D704,634 S | 5/2014 | Eidelman et al. |
| 8,720,844 B2 | 5/2014 | Westimayer et al. |
| D706,321 S | 6/2014 | Oetlinger et al. |
| D709,396 S | 7/2014 | Eidelman et al. |
| 8,905,367 B2 | 12/2014 | Bury |
| D724,971 S | 3/2015 | Bailey et al. |
| D725,511 S | 3/2015 | Read et al. |
| D725,850 S | 3/2015 | Eidelman et al. |
| D742,817 S | 11/2015 | Lammers-Meis et al. |
| D744,658 S | 12/2015 | Hilkey-Boyatt |
| D745,421 S | 12/2015 | Akana et al. |
| D749,570 S | 2/2016 | Lee |
| 9,296,340 B2 | 3/2016 | Skott et al. |
| D761,138 S | 7/2016 | Manabe et al. |
| 9,450,430 B2 | 9/2016 | Fuller et al. |
| D769,869 S | 10/2016 | Zhou et al. |
| D772,745 S | 11/2016 | Henne et al. |
| D774,651 S | 12/2016 | Kaib et al. |
| D778,746 S | 2/2017 | Renganathan |
| D780,238 S | 2/2017 | Kato |
| 9,587,782 B2 | 3/2017 | Johnson et al. |
| D784,325 S | 4/2017 | Kim et al. |
| D788,999 S | 6/2017 | Zinn et al. |
| D797,100 S | 9/2017 | Wieser et al. |
| D798,861 S | 10/2017 | Wieser et al. |
| D800,085 S | 10/2017 | Shepher |
| D800,721 S | 10/2017 | Kim et al. |
| 9,861,080 B1 | 1/2018 | Hathway et al. |
| D812,499 S | 3/2018 | Kuh et al. |
| D815,061 S | 4/2018 | Wei |
| D815,077 S | 4/2018 | Sibley et al. |
| 9,949,459 B2 | 4/2018 | Pattie et al. |
| D816,520 S | 5/2018 | Elrod et al. |
| D817,558 S | 5/2018 | Lee et al. |
| D819,633 S | 6/2018 | Jun |
| 9,986,791 B2 | 6/2018 | Botkus et al. |
| 10,021,946 B2 | 7/2018 | Kaneko |
| D828,189 S | 9/2018 | Benedetti |
| D838,716 S | 1/2019 | Teng et al. |
| D839,753 S | 2/2019 | Domke et al. |
| D840,251 S | 2/2019 | Choi |
| D841,005 S | 2/2019 | Lin |
| D846,748 S | 4/2019 | Benedikter |
| D850,627 S | 6/2019 | Purani et al. |
| 10,376,020 B1 | 8/2019 | Doyle et al. |
| 2002/0010390 A1 | 1/2002 | Guice et al. |
| 2003/0116101 A1 | 6/2003 | Kim et al. |
| 2006/0000194 A1 | 1/2006 | Duncan et al. |
| 2007/0209604 A1 | 9/2007 | Groh et al. |
| 2007/0221140 A1 | 9/2007 | Warren et al. |
| 2007/0246637 A1 | 10/2007 | Ju |
| 2009/0013939 A1 | 1/2009 | Santiago et al. |
| 2009/0038670 A1 | 2/2009 | Shu |
| 2012/0048213 A1 | 3/2012 | Konovalov |
| 2012/0312936 A1 | 12/2012 | Huang et al. |
| 2013/0006065 A1 | 1/2013 | Yanai et al. |
| 2013/0105662 A1 | 5/2013 | Cote et al. |
| 2014/0290013 A1 | 10/2014 | Eidelman et al. |
| 2015/0020751 A1 | 1/2015 | Pattie et al. |

(56) References Cited

U.S. PATENT DOCUMENTS

2017/0208775 A1 7/2017 Van Curen et al.
2018/0098525 A1 4/2018 Lee et al.

OTHER PUBLICATIONS

"Amazon.com, Inc. Web page, JPO's Prior Design Ref. No. HJ27044048", Date first available, Oct. 5, 2015, 7 pp.
"Whistle 3 GPS Pet Tracker & Activity, Available for sale Jun. 8, 2007 [online]", Amazon.com, [Retrieved on Jul. 1, 2018], Available from internet URL:<https://www.amazon.com/dp/b01n7mwkwy/ref=sspa_dk_detail_1?pcs=1, 9 pages.

PET HEALTH MONITOR WITH COLLAR ATTACHMENT AND CHARGER

CROSS-REFERENCE TO RELATED APPLICATIONS

This application is a continuation of U.S. application Ser. No. 14/231,615, filed Mar. 31, 2014, which, in turn, claims the benefit under 35 U.S.C. § 119(e) of U.S. Provisional Patent Application No. 61/806,710, filed Mar. 29, 2013, the entire disclosures of which are incorporated herein by this reference.

FIELD OF THE INVENTION

The present disclosure relates generally to electronic monitor devices, collar attachments for securing a monitor device to a pet animal or other entity, and devices for charging a monitor device.

BACKGROUND

The approaches described in this section could be pursued, but are not necessarily approaches that have been previously conceived or pursued. Therefore, unless otherwise indicated herein, the approaches described in this section are not admitted to be prior art by inclusion in this section.

Owners and keepers of pet animals collectively spend millions of dollars annually on pet products and pet care services. Many of the products and services purchased by pet owners relate to maintaining their pets' health and happiness. For example, pet owners commonly purchase pet toys for entertainment and exercise, pet collars and other accessories for safety and identification, and rely on veterinary services to provide medical care.

While many available pet products and services aim to improve a pet's health and well-being, these products and services suffer from an inability to track a pet's ongoing activities and behaviors which may provide meaningful feedback about a pet's condition. For example, owners and keepers of pet animals typically encounter difficulty creating and regularly maintaining records of pet activity and habits, and often lack any information about the activities of pets while the pets are not under human supervision. Pet owners may wish to acquire information and feedback about the activities of their pets throughout the day while the pets are at home, at a care facility, or any other location whether or not the owners or keepers are present.

SUMMARY OF THE INVENTION

The appended claims may serve as a summary of the invention.

BRIEF DESCRIPTION OF THE DRAWINGS

The features and advantages of the various example embodiments contained in this disclosure will become apparent from the following detailed description when considered in conjunction with the accompanying drawings. Where possible, the same reference numerals and characters are used to denote like features, elements, components or portions of the various inventive embodiments. It is intended that changes and modifications can be made to the described example embodiments without departing from the true scope and spirit of the various inventive embodiments.

In the drawings.

DETAILED DESCRIPTION

Figure 1:
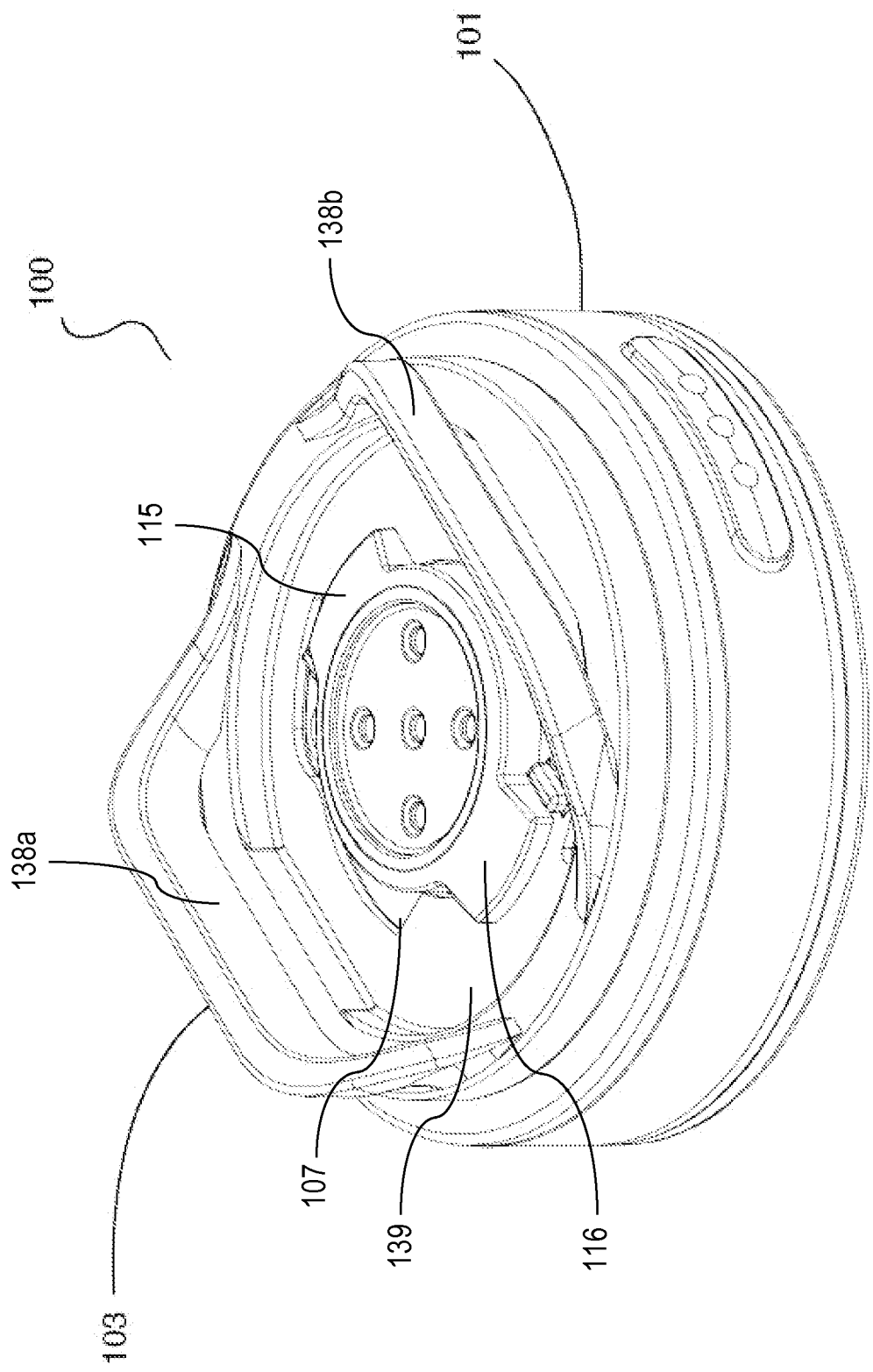
FIG. 1 is an isometric view of a monitor assembled to a collar attachment in accordance with an embodiment.

In the following description, for the purposes of explanation, numerous specific details are set forth in order to provide a thorough understanding of the various inventive embodiments. It will be apparent, however, to one skilled in the art that the present invention may be practiced without these specific details.

Embodiments are described herein according to the following outline:
1.0 General Overview
2.0 Structural Overview
2.1 Example Monitor Device
2.2 Example Collar Attachment Apparatus
2.3 Example Charger Apparatus
3.0 Extension and Alternatives
  1.0 General Overview In various embodiments, a monitor device, a collar attachment, and a charger apparatus are disclosed. One non-limiting example of a monitor is a pet monitor which is a device configured to monitor and track the activities of a pet animal to which the monitor may be attached. In one embodiment, a monitor may be attached to a pet animal using a collar attachment that is configured to engage with the pet monitor and is further configured to attach to a pet collar or other accessory that may be worn by the pet animal.

The ability to conveniently attach to a pet animal a monitor device which collects activity data and communicates the data to other connected devices, such as a computer or smart phone, may provide several insights and benefits to pet owners. For example, a pet monitor may continuously collect and store various types of information about a pet including activity data, location data, and other types of information about the pet's ongoing habits. In one embodiment, a pet monitor may be used to detect interactions between a pet and other pets and humans via detecting proximity relationships between the monitor and other monitor and/or computing devices. The information collected by a monitor may be analyzed by the monitor and/or other computing devices to which the information may be sent in order to provide greater insight into a pet's life than may otherwise be available through human intuition alone.

In an embodiment, a collar attachment apparatus comprises a collar attachment comprising a disk having a first collar band loop integrally formed with the disk along a first arcuate perimeter portion of the disk and a second collar band loop integrally formed with the disk along a second arcuate perimeter portion of the disk that is opposite the first arcuate perimeter portion of the disk; a keyhole in the disk; friction attachment means formed in an underside of the disk and configured to receive at least a first tab of an attached device and to snugly hold the first tab against the underside of the disk after rotation of the attached device in the keyhole.

In an embodiment, the apparatus further comprises an elongated collar band extending through the first collar band loop and the second collar band loop. In an embodiment, the collar band comprises a snap closure having a post and a friction snap that is configured to snugly grip and retain the post. In an embodiment, the collar band comprises one or more adjustment holes configured to pass over the post.

In an embodiment, the first collar band loop and the second collar band loop each comprise an elongated slot through which the collar band extends. In an embodiment, the collar band is configured to loop around a portion of a pet collar.

In an embodiment, the disk of the apparatus comprises at least a first protruding stop configured to prevent over-rotation of the attached device in the keyhole. In an embodiment, the keyhole comprises a substantially circular orifice in the disk.

In an embodiment, the attached device further comprises a second tab, wherein the first tab is shaped asymmetrically relative to the second tab.

In an embodiment, the attached device comprises a pet monitor.

2.0 Structural Overview

FIG. 1 is an isometric view of an example monitor assembled to a collar attachment. In an embodiment, the view of FIG. 1 depicts a monitor and collar attachment assembly 100 that includes a monitor 101 and a collar attachment 103. For example, the monitor 101 may be assembled to the collar attachment 103 for the purposes of attaching the monitor 101 and collar attachment 103 to a pet collar or other pet accessory.

In one embodiment, collar attachment 103 generally comprises a collar attachment disk 139, collar band loops 138a, 138b, and a keyhole 107. As depicted in FIG. 1, in an embodiment, keyhole 107 may be configured to receive tabs 115, 116 formed on the underside of the monitor 101. In an embodiment, a monitor 101 that is engaged with collar attachment 103 may be rotated causing the collar attachment 103 to snugly hold tabs 115, 116 against the underside of the disk 139. In one embodiment, a collar attachment 103 may snugly hold tabs 115, 116 using a friction attachment means formed in an underside of the collar attachment 103. For example, the friction attachment means may be configured to resist monitor 101 separating from collar attachment by creating a friction relationship between the tabs 115, 116 and the underside of disk 139 after rotation of the monitor 101 in the keyhole 107. In this way, a manual rotation of the monitor 101 relative to the collar attachment either clockwise or counter-clockwise may cause the monitor 101 to engage or disengage from the collar attachment 103.

2.1 Example Monitor

Figure 2:
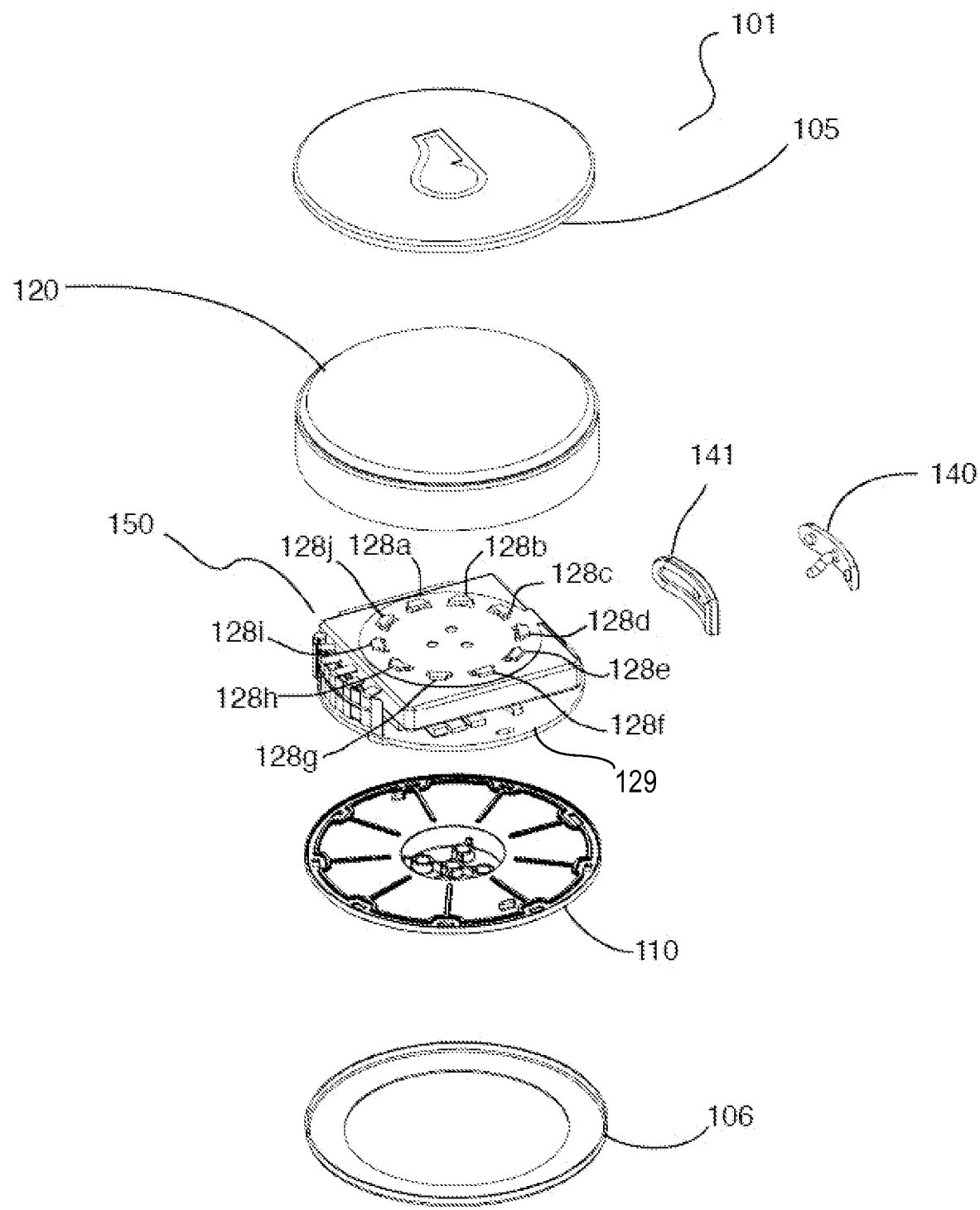
FIG. 2 is an isometric exploded view depicting components of a monitor in accordance with an embodiment.

FIG. 2 is an isometric exploded view depicting components of an example monitor. In an embodiment, a monitor 101 comprises top bezel 105, lens cover assembly 120, electronics package 150, Light Emitting Diodes (LED) 128a-128j, button gasket 141, button 140, bottom housing 110, and bottom bezel 106.

In one embodiment, top bezel 105 may comprise a metallic material that may be adhered to or mechanically attached to lens cover assembly 120. Because the top bezel 105 represents the front face of the monitor 101, the top bezel 105 may be subjected to various impact forces from time to time such as animal bites, the monitor being dropped, or collisions with other objects. Thus, top bezel 105 may comprise a metallic or other durable material in order to provide resistance to impact forces. Further, a metallic surface may be used to personalize a monitor 101 through etching or engraving on the surface of the top bezel 105. In an embodiment, metal or other similar materials may also provide a reflective inside surface that may be configured to direct light to desired locations of the monitor 101.

In an embodiment, lens cover assembly 120 may act as a lens and generally as a top cover of the monitor 101 enclosure that houses an electronics package 150 and other components that may be situated inside of monitor 101. A lens cover assembly is described in further detail herein in reference to FIG. 3.

In an embodiment, electronics package 150 generally may comprise any electronic components that enable the monitor 101 to perform various operations including collecting and storing pet activity data, communicating with other devices, and receiving and processing user input. In one embodiment, electronics package comprises light-emitting diodes (LEDs) 128a-128j and a printed circuit board 129.

In one embodiment, LEDs 128a-128j may be placed in a circular arrangement as depicted in FIG. 2 so that light emitted from the LEDs is directed towards the perimeter of monitor 101. For example, light directed to the perimeter of the monitor 101 may be emitted through a translucent perimeter section of lens cover assembly 120 in order to provide the appearance of a glowing ring around the monitor 101. The emitted light may be used for aesthetic purposes and/or to provide users with indications related to the operation of the monitor 101, described in more detail hereinafter. Printed circuit board 129 generally may support and connect any electronic components which may be configured to perform various processing functions related to the operation of monitor 101.

In an embodiment, the electronics package 150 may also include an electronic switch (not pictured) which, for example, may be activated by a user via a button 140. In an embodiment, a button gasket 141 may be sealed to lens cover assembly 120 and may be made from an elastomer that acts as both a gasket and a spring force for button 140. Button gasket 141 may be adhered to, insert molded, or co-molded in place with lens cover assembly 120 so that a water-tight interface is formed either chemically or mechanically. Button 140 may be adhered to the button gasket 141, enabling a physical connection between button 140 and electronics package 150. In an embodiment, monitor 101 generally may be assembled to resist any liquid or debris ingress through either button gasket 141 or other exterior portions of monitor 101.

In an embodiment, a bottom housing 110 may be configured to engage with lens cover assembly 120 to form an enclosure surrounding electronics package 150, described in more detail hereinafter in reference to FIGS. 3, 4. In reference to FIG. 2, a bottom bezel 106 may be similar to top bezel 105 and configured to adhere to bottom housing 110. In one embodiment, the bottom bezel 106 may include a circular orifice in the middle of the bezel so that features formed on the underside of bottom housing 110 enclosure may be exposed. The bottom bezel 106 may be provided for aesthetic and/or support purposes, for example, by covering the corners of the bottom housing 110 to protect from impacting forces. Bottom bezel 106 may be attached to bottom housing 110 using any adhesive or mechanical attachment mechanisms.

The circular appearance of various components of monitor 101 in part provide a distinctive ornamental design that is not purely functional or required for the functionality of the other features herein. For example, monitor 101 generally could be oval-shaped, square-shaped, or in any other shape depending on a desired aesthetic for the monitor 101.

Figure 3:
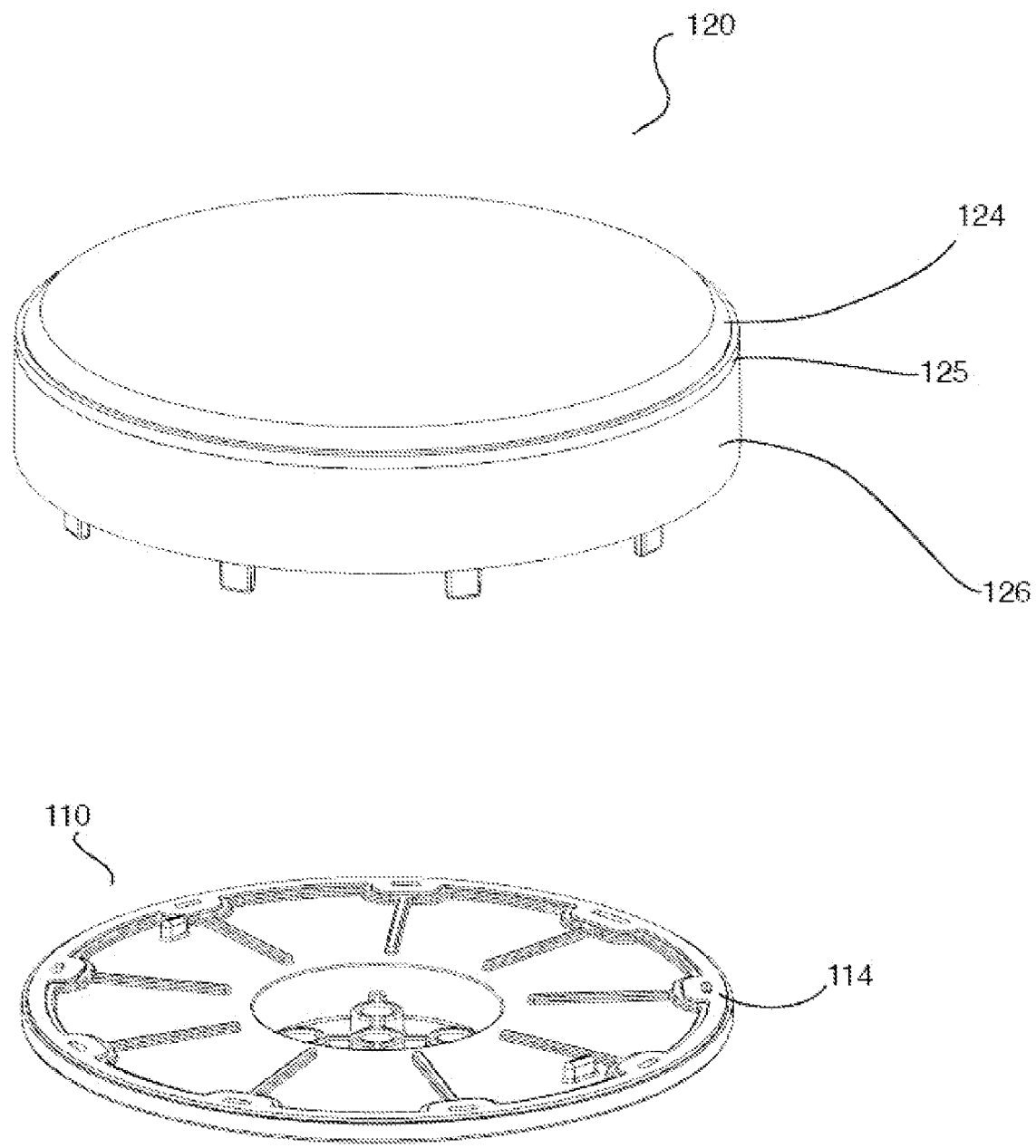
FIG. 3 is an isometric exploded view depicting a lens cover assembly and bottom housing of a monitor in accordance with an embodiment.

FIG. 3 is an isometric exploded view showing an example of a lens cover assembly and bottom housing of a monitor 101. In an embodiment, a lens cover assembly 120 and a bottom housing 110 may be configured to enclose an electronics package 150 and any other internal components of monitor 101. Each of lens cover assembly 120, bottom housing 110, and any components thereof may be formed using thermal plastic, such as injection molded plastics that produce integrally formed parts, or metals, composites, or other materials. For example, each of lens cover assembly 120 and bottom housing 110 may be formed as an integrated part consisting of varying materials that may each exhibit different properties.

In an embodiment, lens cover assembly 120 comprises a lens cover reflecting surface 124, lens cover light pipe 125, lens cover wall 126. In an embodiment, a monitor 101 may include forms of visual feedback to indicate to a user that the monitor 101 is functioning properly or that the monitor 101 is in various other processing states including, for example, connecting to a charging device, establishing a wired or wireless network connection with another device, or sending or receiving data from another device. In one embodiment, visual feedback may be provided to a user in the form of one or more lights displayed on the monitor 101. As one example, light may be emitted in one or more rings forming a perimeter of the monitor 101. To permit light to emit from one or more areas of the exterior of monitor 101, the exterior elements of monitor 101 may include both optically clear and opaque material. For example, an optically clear portion may be formed on a top segment of the lens cover assembly 120 and end at the bottom of a light pipe 125. In an embodiment, lens cover wall 126 may be formed of an opaque thermal plastic that does not transmit light. The optically clear top segment of lens cover assembly 120 may include a lens cover reflecting surface 124 that is angled so that light can transmit down to the light pipe 125. The light may be emitted from the interior of the monitor 101, for example, using one or more LEDs 128a-128j, as depicted in FIG. 2

In an embodiment, bottom housing 110 includes a bottom housing gasket 114. Bottom housing gasket, for example, may be configured to form a water-tight seal when the bottom housing 110 is engaged with the lens cover assembly 120.

Figure 4:
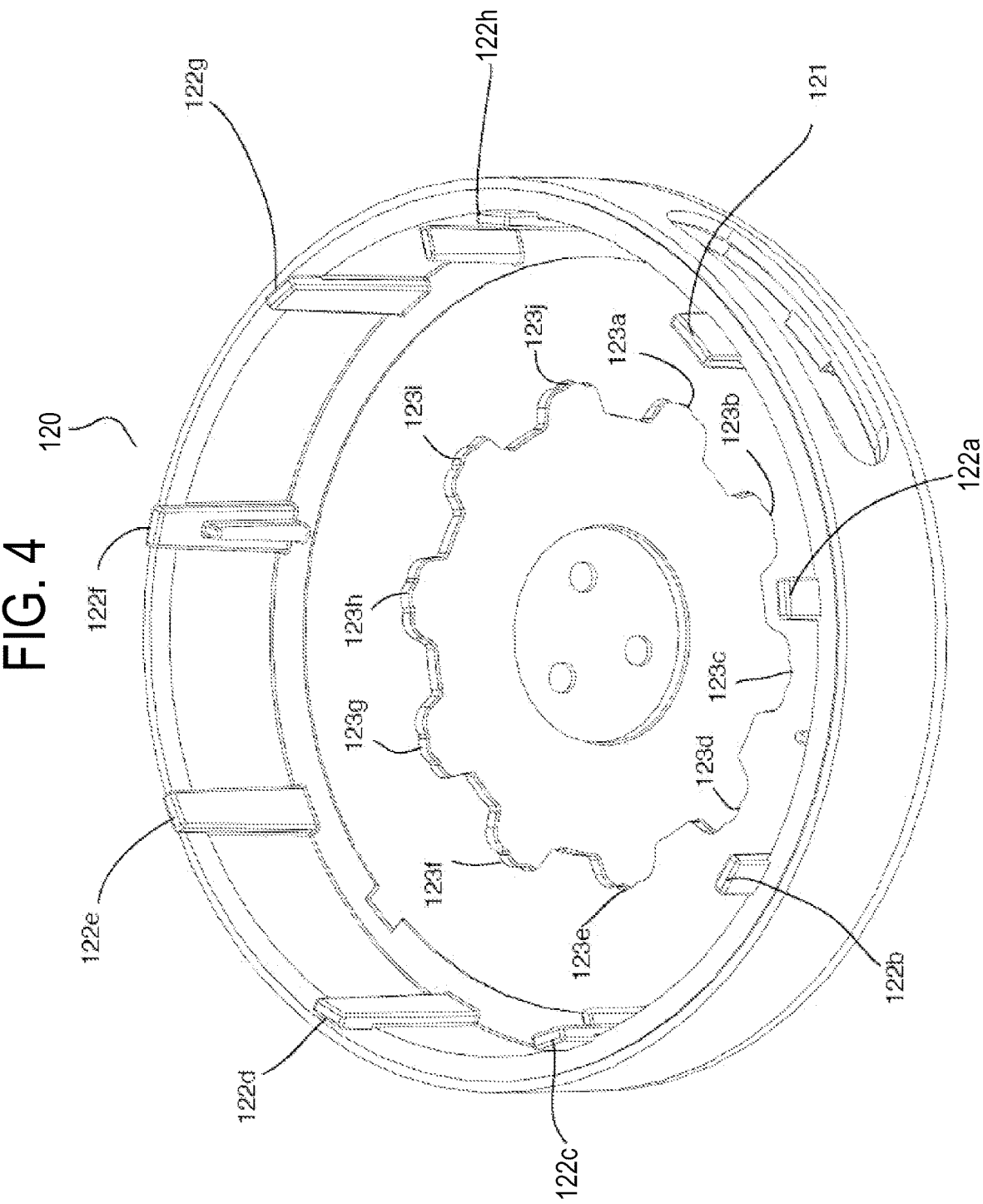
FIG. 4 is an isometric view of a lens cover assembly of a monitor in accordance with an embodiment.

FIG. 4 is an isometric view of the underside of an example lens cover assembly 120. In an embodiment, lens cover assembly 120 includes a lens cover keyed stake 121, lens cover stakes 122a-122h, and lens cover optical features 123a-123j. For example, lens cover assembly 120 may assemble to a bottom housing 110 (as depicted in FIG. 3) by engaging each of lens cover stakes 122a-122h with a corresponding stake hole of bottom housing 110. In one embodiment, lens cover stakes 122a-122h may be configured so that the lens cover assembly 120 may be assembled in only a single orientation with respect to bottom housing 110. For example, lens cover assembly 120 may comprise a lens cover keyed stake 121 which corresponds to a single bottom housing keyed stake hole 111, described hereinafter in reference to FIG. 5.

In an embodiment, each of lens cover optical features 123a-123j may correspond with one of the LEDs 128a-128j depicted in FIG. 2. For example, each of the lens cover optical features 123a-123j may be formed with a specific geometry that enables a side-firing LED (e.g., LEDs 128a-128j) to transmit light towards the light pipe 125 formed on the outside perimeter of the monitor 101 enabling a ring of light to be displayed.

Figure 5:
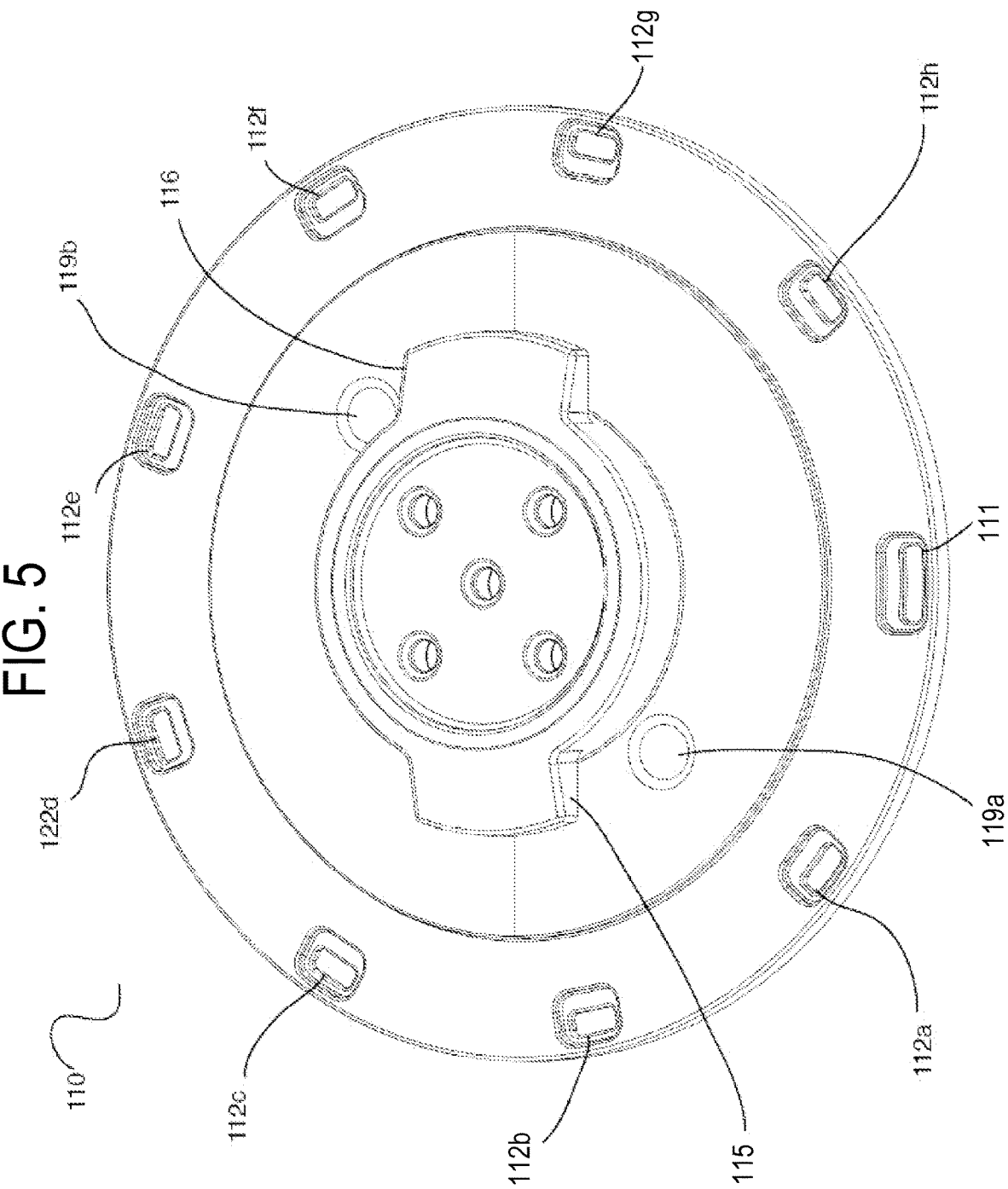
FIG. 5 is an isometric view of the bottom housing of a monitor in accordance with an embodiment.

FIG. 5 is an isometric view of the bottom housing of an example monitor. In an embodiment, bottom housing 110 comprises bottom housing keyed stake hole 111, bottom housing stake holes 112a-112h, a first tab 115 and a second tab 116, and bottom housing detents 119a, 119b.

In an embodiment, bottom housing keyed stake hole 111 and bottom housing stake holes 112a-112h may be configured to engage with corresponding lens cover stakes 122a-122h of a lens cover assembly 120, as described above, in order to form an enclosure of monitor 101.

In an embodiment, tabs 115, 116 may enable a monitor 101 to engage with other devices and apparatus configured to receive the geometry of tabs 115, 116. For example, each of tabs 115, 116 may be configured to engage with a friction attachment means of a collar attachment 103 in order to secure a monitor 101 to the collar attachment 103. A friction attachment means of a collar attachment 103 generally may be any portion of the collar attachment 103 that is configured to receive one or more of the tabs 115, 116 and to cause the tabs to be held snugly against the collar attachment after rotation of the tabs 115, 116 in a keyhole 107.

In one embodiment, tabs 115, 116 may be asymmetrically designed. For example, the top faces of each of tabs 115, 116 may be sloped with respect to bottom housing 110, where each tab slopes in a direction opposite to the slope of the other tab. An asymmetrical design of tabs 115, 116 may cause monitor 101 to engage with other assemblies, such as a collar attachment or charger assembly, in only a limited number of orientations, if desired.

In an embodiment, bottom housing 110 may comprise bottom housing detents 119a, 119b which may be configured to receive a catch or other element of a collar attachment 103 to further secure a connection between a monitor 101 and a collar attachment 103. For example, a catch may be positioned on a collar attachment 103 such that the catch engages with a bottom housing detent 119a, 119b when a monitor 101 is rotated in a keyhole 107 of the collar attachment 103.

In one embodiment, a monitor 101 may be configured to provide an indication when the monitor is engaged with a collar attachment 103 or other apparatus. For example, a monitor 101 and a collar attachment 103 may be configured such that a particular surface of each of the monitor 101 and the collar attachment 103 are mated when the devices engage with one another. The mating of the particular surfaces of the monitor 101 and the collar attachment 103 may, for example, cause the formation of an electrical current or other connection that may be detected by a monitor 101. The formation of an electrical current or connection may be detected by logic of the monitor 101 to determine whether the monitor is currently mated to a collar attachment and may cause the monitor 101 to perform particular processing actions.

2.2 Example Collar Attachment

Due in part to the range of environments and activities that a pet or other entity wearing a monitor (e.g., monitor 101) may experience, in one embodiment, it may be desirable for a monitor device to be secured to a pet collar or other wearable pet accessory such that the monitor may be removed from the pet only when desired. Furthermore, by affixing a monitor to a pet collar or other accessory, the monitor may be positioned in a proximal orientation to the pet's body that facilitates tracking the pet's motions and activities. For example, normal pet activity may include running, jumping, and shaking, and therefore a sturdy connection may be desired between the monitor and a pet. In an embodiment, it may also be desirable for a user to be able easily to remove an attached monitor from the pet, for example, to recharge the monitor or to connect the monitor to another device.

Figure 6:
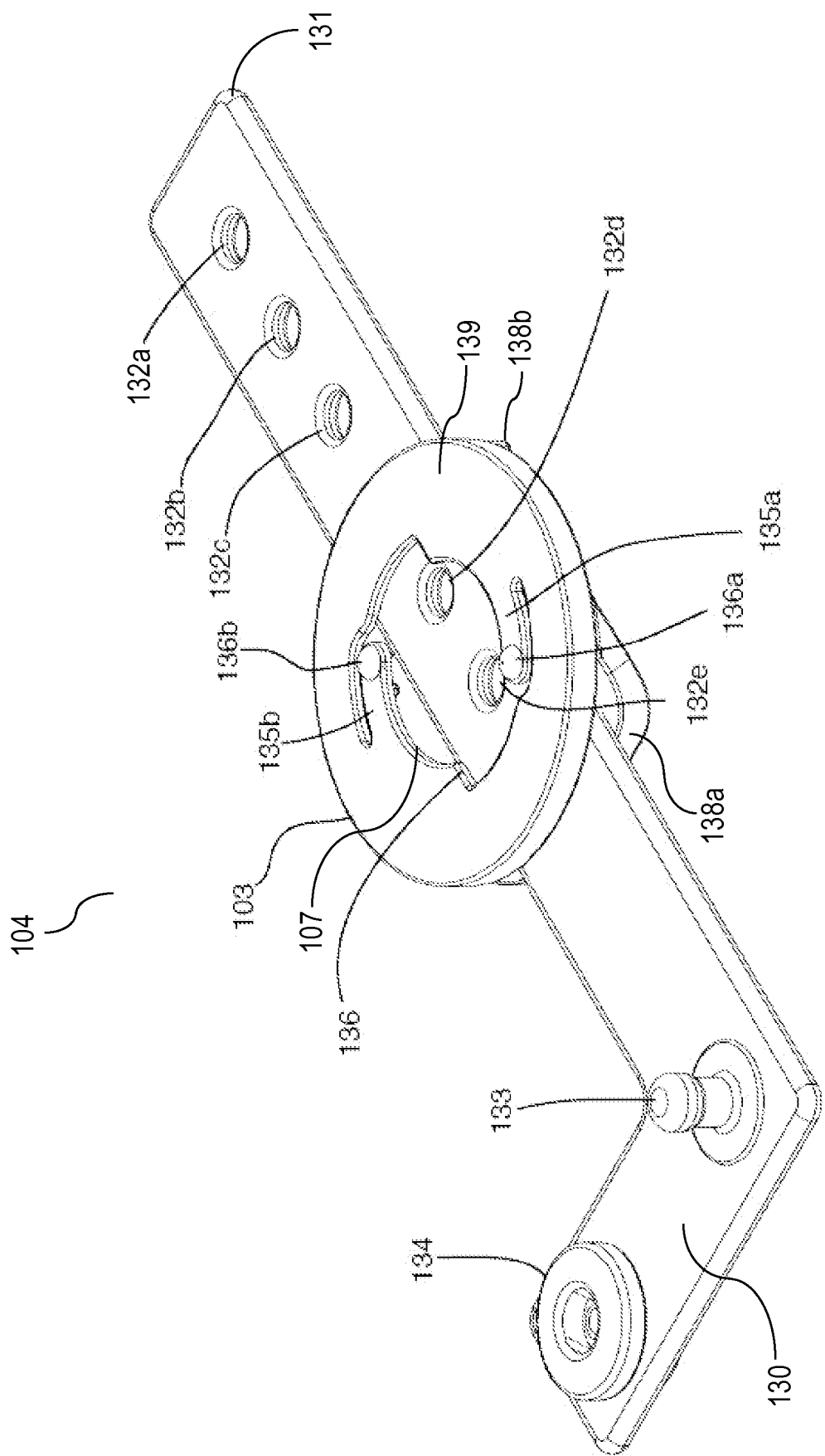
FIG. 6 is an isometric view of a collar attachment assembled to a collar band in accordance with an embodiment.

FIG. 6 is an isometric view of a collar attachment assembled to a collar band. In FIG. 6, a collar band 131 is depicted extending through collar band loops 138a, 138b of a collar attachment 103. In an embodiment, collar attachment 103 may be configured to receive and secure a monitor 101, and collar band 131 may be configured to secure the collar attachment 103 and monitor 101 to a pet collar or other wearable pet accessory.

In one embodiment, a collar attachment 103 includes a collar attachment disk 139, keyhole 107, collar band loops 138a, 138b, collar attachment springs 135a, 135b, and collar attachment catches 136a, 136b. In general, a keyhole 107 may be formed in an interior portion of the disk 139 and configured to receive or more elements (e.g., tabs 115, 116) of a monitor 101. For example, the outline of keyhole 107 may be formed such that tabs 115, 116 of a monitor 101 may be inserted into the keyhole 107 when the monitor is positioned in one or more particular orientations.

In an embodiment, a collar attachment 103 may include a friction attachment means configured such that when tabs 115, 116 of a monitor 101 are inserted into the keyhole 107, and the monitor 101 is rotated in the keyhole 107, the tabs 115, 116 are held snugly against the underside of the disk 139.

In one embodiment, a collar attachment 103 may include catches 136a, 136b which may be flexed out of the way by springs 135a, 135b when tabs 115, 116 are initially inserted into the keyhole 107 and, after the monitor 101 is rotated in the keyhole 107, the catches 136a, 136b may spring into bottom housing detents 119a, 119b located on the bottom surface of the bottom housing. The engagement of catches 136a, 136b with the bottom housing detents 119a, 119b may further secure the monitor 101 into a particular engaged position with collar attachment 103.

In one embodiment, a collar attachment 103, and a monitor 101 if the monitor is attached to collar attachment 103, may be configured to be secured to an accessory worn by a pet such as a pet collar. For example, collar band 131 may be configured to loop around a pet collar or other accessory to couple the collar attachment to the collar.

Pet collars generally may come in a wide range of materials, widths, and thicknesses and, therefore, collar attachment 103 may be configured to accommodate a wide range of pet collars. In one embodiment, collar band 131 may be made from a conformable material, such as an elastomer, and may comprise a collar band snap closure 130 including collar band adjustment holes 132a-132e, collar band post 133, and collar band friction snap 134. In an embodiment, when collar band 131 is looped around a pet collar or other wearable pet accessory, any one of the collar band adjustment holes 132a-132e may pass over collar band post 133 once looped, depending on a width and thickness of the collar. The collar band friction snap 134 may be configured to receive to snugly grip and retain collar band post 133 over the wrapped portion of the collar band 131, thereby securing the collar band 131 and collar attachment 103 to a pet collar.

Figure 7:
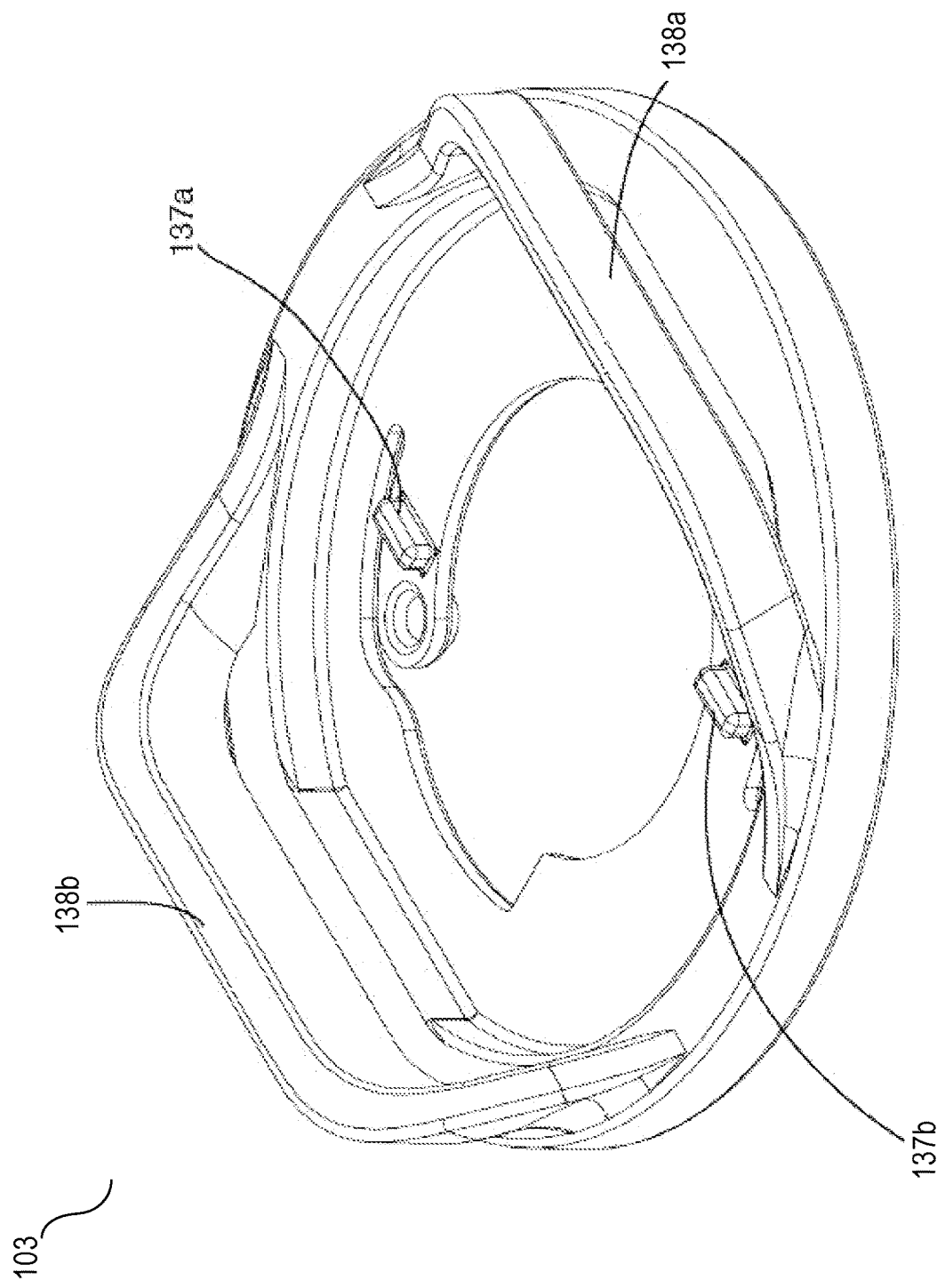
FIG. 7 is an isometric view of a collar attachment in accordance with an embodiment.

FIG. 7 is an isometric view of the underside of a collar attachment 103. In FIG. 7, collar attachment 103 includes collar band loops 138a, 138b and monitor stops 137a, 137b.

In an embodiment, each of collar band loops 138a, 138b may be integrally formed with the collar attachment disk 139 along an arcuate perimeter of the disk 139. In one embodiment, collar band loops 138a, 138b may be formed opposite of one another on the disk 139 so that a collar band 131 may extend through each of the collar band loops 138a, 138b. For example, in one embodiment, a collar band (e.g., collar band 131) may fit through the elongated slots provided by each collar band loops 138a, 138b such that a collar band 131 can be fed from the distal end of the collar attachment to the proximal.

In an embodiment, a collar band 131 may provide a membrane that acts as a spring and a protective barrier for the bottom housing 110 of a monitor 101. For example, when a collar band 131 is situated through collar band loops 138a, 138b, and a monitor 101 is secured in the keyhole of a collar attachment 103, the collar band 131 may act to compress against the monitor 101 providing additional resistance to hold the monitor 101 in place.

In one embodiment, monitor stops 137a, 137b may be configured to protrude from the underside of collar attachment 103 to provide additional resistance against tabs 115, 116 when a monitor 101 is rotated in keyhole 107.

2.3 Example Charger

In an embodiment, one or more electrical components of a monitor may be powered by an electrical source such as a rechargeable lithium-ion polymer battery. Due the nature of rechargeable batteries, a monitor may be connected to an external power source from time to time in order to recharge a battery of the monitor. In one embodiment, a charger apparatus may be configured to receive a monitor and to provide an electrical charge for the purposes of recharging an onboard battery.

Figure 8:
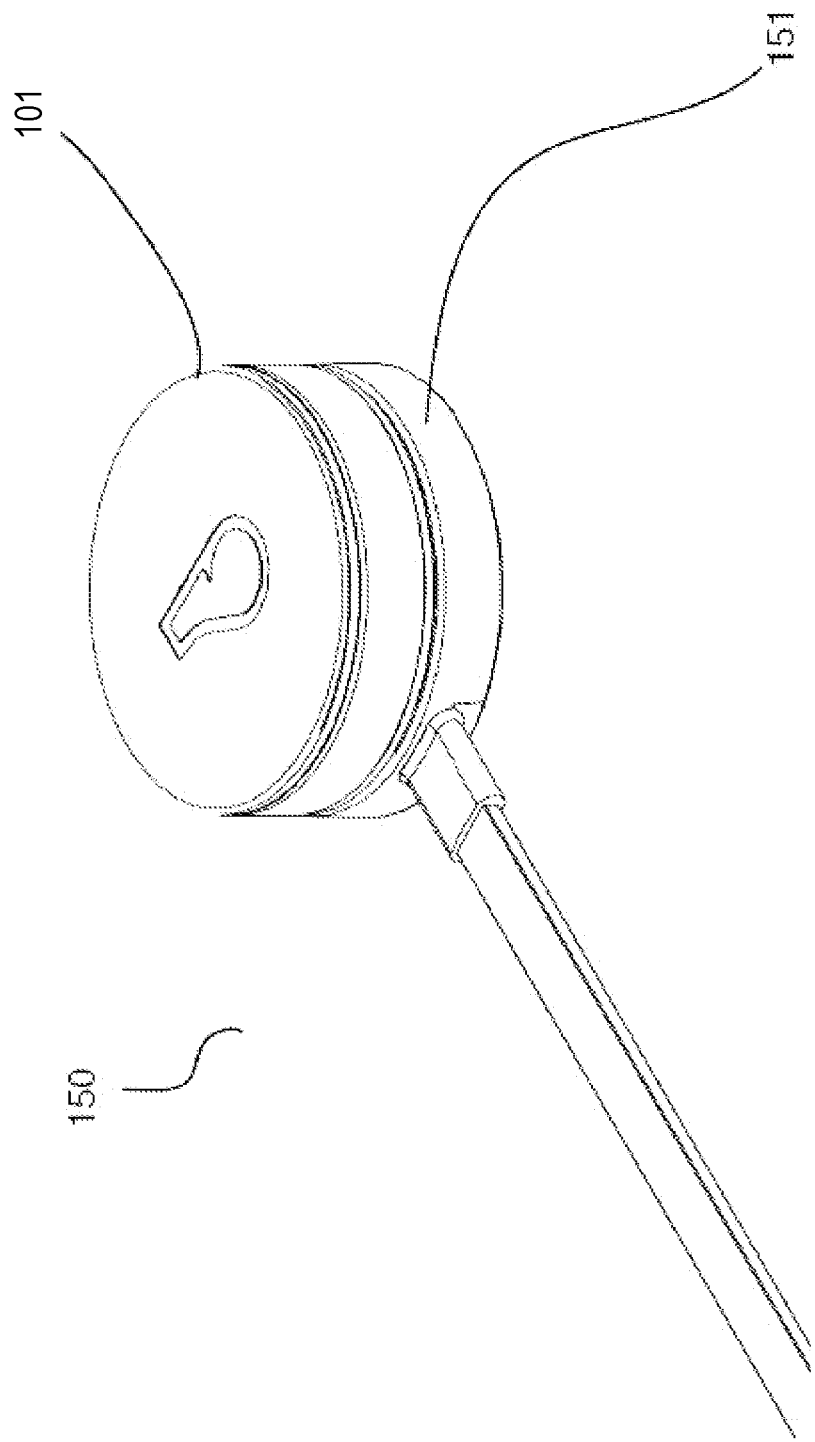
FIG. 8 is an isometric view of a monitor assembled to a charger apparatus in accordance with an embodiment.

FIG. 8 is an isometric view of an example monitor assembled to a charger apparatus. For example, in FIG. 8, a charger apparatus 151 is depicted with a monitor 101 engaged with a charger base. In an embodiment, charger apparatus 151 may be connected to an external power supply, for example, by the cord extending from the base of the charger apparatus 151.

Figure 9:
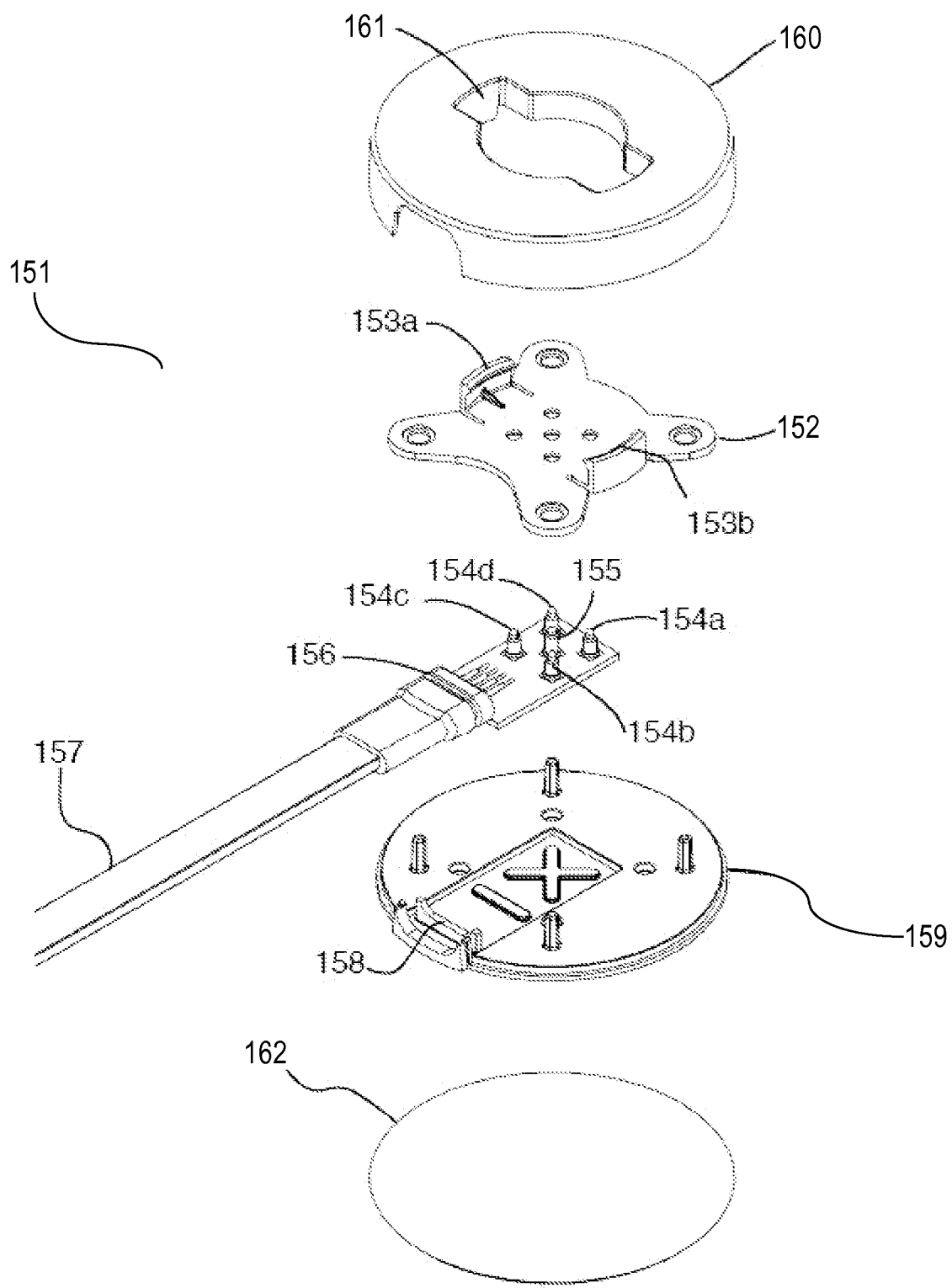
FIG. 9 is an exploded isometric view of a charger apparatus in accordance with an embodiment.

FIG. 9 is an exploded isometric view of a charger apparatus 151. In an embodiment, a charger apparatus 151 comprises a charger cover 160, charger cover wall 161, interior plate 152, monitor snaps 153a, 153b, contact pins 154a-154d, ground pin 155, charger cord strain relief 156, charger cord 157, base 159, and charger pad 162.

In an embodiment, a charger cover 160 comprises a charger cover wall 161 which may be configured to allow a monitor 101 to engage with the charger apparatus 151 in a single orientation. For example, charger cover wall 161 may be configured to receive asymmetrically designed tabs 115, 116 of a monitor 101 in only a single orientation. Whereas a collar attachment 103 may be configured to receive a monitor 101 in either of two oppositely positioned orientations, in an embodiment, charger apparatus 151 may be configured to receive a monitor 101 in only one orientation so that a plurality of contact pins 154a-154d engage directly to appropriate corresponding contacts on the monitor 101 (not pictured). In one embodiment, a charger ground pin 155 may be slightly taller than the other contact pins 154a-154 so that a monitor 101 is engaged with the ground pin 155 as the initial electrical contact to prevent damage to electronics of monitor 101.

In an embodiment, a charger apparatus 151 may be configured to securely engage with a monitor 101 so that the monitor 101 does not disengage from the charger apparatus 151 unintentionally and without a certain amount of force. In an embodiment, charger apparatus 151 may include an interior plate 152 comprising oppositely positioned monitor snaps 153*a*, 153*b*. For example, the monitor snaps 153*a*, 153*b* may be configured to flex in and out of the way of tabs 115, 116 of a monitor 101 as the monitor 101 engages with the charger apparatus 151. For example, a user may place a monitor 101 on top of charger pad 162 with the tabs 115, 116 of the monitor aligned with charger cover wall 161 and apply an amount of downward force to the monitor 101 so that the tabs 115, 116 engage with and are secured by monitor snaps 153*a*, 153*b*, thereby holding the monitor 101 in place. In an embodiment, monitor snaps 153*a*, 153*b* may be asymmetrically formed with respect to one another in order to correspond with an asymmetrical design of tabs 115, 116 of a monitor 101.

In an embodiment, a charger apparatus 151 may include a charger cord 157 that connects with an external power source (not pictured) using a conventional power plug. In a related embodiment, charger cord 157 may terminate in a Universal Serial Bus (USB) plug (not pictured). A USB plug may be used both to provide a power source for charging a monitor 101 and/or to connect a monitor 101 to another computing device for transferring data to or from the monitor 101.

In an embodiment, charger apparatus 151 may be configured to provide an amount of strain relief such that if charger cord 157 is unintentionally pulled, the charger cord 157 may be restricted from disengaging from the charger base 159. In an embodiment, strain relief 156 may provide a geometric design that acts against similar geometry 158 located on the charger base 159.

In an embodiment, a charger apparatus 151 may further comprise a charger pad 162 that may be placed on the bottom of base 159. In an embodiment, a charger pad 162 may be used to provide additional stability to the charger apparatus 151 by increasing an amount of friction between the charger apparatus 151 and a surface upon which the charger apparatus 151 may be resting.

4.0 Extensions and Alternatives

In the foregoing specification, various inventive embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage, sequence, order, or attribute that is not expressly recited in a claim should limit the scope of such claim in any way. The specification and drawings are, accordingly, to be regarded in an example rather than a restrictive sense.

What is claimed is:

1. A collar attachment apparatus comprising: a collar attachment comprising a disk having a first collar band loop integrally formed with the disk along a first arcuate perimeter portion of the disk and a second collar band loop integrally formed with the disk along a second arcuate perimeter portion of the disk that is opposite the first arcuate perimeter portion of the disk; a keyhole in the disk; one or more collar attachment spring arms adjacent to the keyhole; and one or more collar attachment catches, wherein each collar attachment catch is adjacent to at least one of the collar attachment spring arms.

2. The collar attachment apparatus of claim 1 further comprising an elongated collar band extending through the first collar band loop and the second collar band loop.

3. The collar attachment apparatus of claim 2 wherein the collar band comprises a snap closure having a post and a friction snap that is configured to snugly grip and retain the post.

4. The collar attachment apparatus of claim 3 wherein the collar band comprises one or more adjustment holes configured to pass over the post.

5. The collar attachment apparatus of claim 2 wherein the first collar band loop and the second collar band loop each comprise an elongated slot through which the collar band extends.

6. The collar attachment apparatus of claim 2 wherein the collar band is configured to loop around a portion of a pet collar.

7. The collar attachment apparatus of claim 1 wherein the disk comprises at least a first protruding stop configured to prevent over-rotation of the attached device in the keyhole.

8. The collar attachment apparatus of claim 1 wherein the keyhole comprises a substantially circular orifice in the disk.

9. The collar attachment apparatus of claim 1 wherein the attached device further comprises a first tab and a second tab, wherein the first tab is shaped asymmetrically relative to the second tab.

10. The collar attachment apparatus of claim 1 wherein the attached device comprises a pet monitor.

* * * * *